United States Patent
Konno (10) Patent No.: US 6,870,691 B2
(45) Date of Patent: Mar. 22, 2005

(54) IMAGE TAKING APPARATUS (75) Inventor: Kenji Konno, Sakai (JP)

(73) Assignee: Minolta Co., Ltd., Osaka (JP)

( * ) Notice: Subject to any disclaimer, the term of this patent is extended or adjusted under 35 U.S.C. 154(b) by 14 days.

(21) Appl. No.: 10/624,306

(22) Filed: Jul. 22, 2003

(65) Prior Publication Data
US 2004/0223234 A1 Nov. 11, 2004

(30) Foreign Application Priority Data

May 6, 2003 (JP) .................................. 2003-127740

(51) Int. Cl.[7] .............................................. G02B 9/08
(52) U.S. Cl. ...................................................... 359/738
(58) Field of Search ................................ 359/738, 739, 359/740

(56) References Cited

U.S. PATENT DOCUMENTS

| 5,448,319 A | 9/1995 | Uzawa .......................... 354/81 |
| 6,104,432 A | 8/2000 | Nakamura et al. ........... 348/360 |
| 6,498,687 B1 | 12/2002 | Sekita et al. ................. 359/680 |
| 6,618,090 B1 * | 9/2003 | Kidono et al. ............... 348/362 |

FOREIGN PATENT DOCUMENTS

| EP | 0 906 587 B1 | 9/2002 |
| JP | 08-248318 A | 9/1996 |
| JP | 11-196303 A | 7/1999 |
| JP | 11-258678 A | 9/1999 |
| JP | 2000-131610 A | 5/2000 |
| JP | 2000-137164 A | 5/2000 |

* cited by examiner

Primary Examiner—Scott J. Sugarman
(74) Attorney, Agent, or Firm—Sidley Austin Brown & Wood LLP (57) ABSTRACT An image taking apparatus has a solid-state image-sensing device, a shutter for shutting off the light incident on the solid-state image-sensing device, and a zoom optical system. The optical aperture stop of the zoom optical system and the shutter are located both on the optical axis but at different positions. During zooming, while the optical aperture stop moves along the optical axis, the shutter is kept stationary. The zoom optical system has an optical member having an optical power disposed on the image-plane side of the shutter.

34 Claims, 11 Drawing Sheets

FIG.2

FIG.6A  LONGITUDINAL SPHERICAL ABER.

FIG.6B  ASTIGMATIC FIELD CURVES

FIG.6C  DISTORTION

IMAGE TAKING APPARATUS

This application is based on Japanese Patent Application No. 2003-127740 filed on May 6, 2003, the contents of which are hereby incorporated by reference.

BACKGROUND OF THE INVENTION

1. Field of the Invention

The present invention relates to an image taking apparatus employing a solid-state image-sensing device, and more particularly to a slim image taking apparatus, such as a digital still camera or digital video camera, provided with a zoom tens system.

2. Description of the Prior Art

In recent years, as personal computers and the like become wide-spread, digital still cameras and digital video cameras (hereinafter collectively referred to as digital cameras), which permit easy capturing of image data into digital equipment, have been becoming increasingly popular among individual users. Such digital cameras are expected to continue to become more and more popular into the future as an image data input device.

In general, the im age quality of a digital camera depends on the number of pixels provided in a solid-state image-sensing device, such as CCD (charge-coupled device). Nowadays, digital cameras for general consumers boast of high resolution over one mega pixels, and are closing in on cameras using silver-halide film in image quality. Moreover, even in digital cameras for general consumers, the capability of varying the magnification with which images are taken (i.e., zooming capability) is desired; in particular, optical zooming is desired because it causes minimum image degradation. Furthermore, lately, digital cameras are required not only to offer high image quality but also to be compact, in particular slim so as to be easily portable.

In conventionally proposed zoom lens systems for digital cameras, the most common way to make a digital camera slim is to adopt a so-called collapsible lens barrel. Specifically, when the camera is not used, the lens barrel collapses so as to hold the lenses with minimum distances between them, and, when the camera is used, the lenses move out so as to make the camera ready to photograph. With this construction, it is possible, while maintaining satisfactory optical performance, to reduce the number of constituent lenses and thereby reduce the thickness of the lens barrel in its collapsed state (as exemplified by U.S. Pat. No. 6,498,647).

Another way to make a digital camera slim, i.e., other than by using a collapsible lens barrel, is to arrange a zoom lens system with its lens optical axis parallel to, of all the external faces of the camera body that is, for example, substantially box-shaped, that which has the greatest area. Moreover, as a zoom lens system that offers a large angle of view at the wide-angle end but that nevertheless is compact, there is conventionally known a zoom lens system composed of, from the object side, a first lens unit having a negative optical power, a second lens unit having a positive optical power, and a third lens unit having a positive optical power wherein the first lens unit is kept stationary during zooming (as exemplified by Japanese Patent Application Laid-Open No. 2000-137164). By arranging a zoom lens system like this with its lens optical axis parallel to, of all the external faces of the substantially box-shaped camera body, that which has the greatest area, it is possible to realize a slim digital camera.

For a slim digital camera to be usable, it is required to be slim but nevertheless have its most object-side lens arranged with its optical axis perpendicular to, of all the external faces of the substantially box-shaped camera body, that which has the greatest area. One way to realize this is to bend the optical axis by using a prism in the first lens unit (as exemplified by Japanese Patent Application Laid-Open No. H8-248318).

However, with a construction adopting a collapsible lens barrel, like the one disclosed in U.S. Pat. No. 6,498,687 mentioned above, even though it is possible to achieve slimming-down to a certain degree, there is a limit to reducing the thickness of the lens barrel in its collapsed state. Specifically, the thickness of the lens barrel cannot be reduced to less than the total of the thickness of the lenses themselves, that of the image-sensing device, and that of the optical filter and other components required by the image-sensing device. This makes it impossible to achieve satisfactory slimming-down.

Arranging a zoom lens system, like the one disclosed by Japanese Patent Application Laid-Open No. 2000-137164 mentioned above, with its lens optical axis parallel to, of all the external faces of the substantially box-shaped camera body, that which has the greatest area makes the external shape of the camera elongate, and thus makes the camera extremely difficult to use. Usability may be improved by rotatably fitting the lens barrel so that, when the camera is used, the lens barrel is rotated so as to make the lens optical axis perpendicular to, of all the external faces of the substantially box-shaped camera body, that which has the greatest area. This, however, additionally requires a mechanism for rotating the lens barrel, and thus eventually increases the thickness of the camera. Moreover, extra operations are required to rotate the lens barrel when at the start and end of photographing.

With a so-called positive-led zoom construction, like the one disclosed in Japanese Patent Application Laid-Open No. H8-248318, in which the first lens unit has a positive optical power, it is difficult to achieve zooming with a small number of zooming components, and in fact there are provided as many as four zooming components. This makes the structure of the lens barrel complicated, and thus makes the lens barrel large as a whole including its drive components. This makes the camera as a whole wide, and makes satisfactory slimming-down impossible.

SUMMARY OF THE INVENTION

An object of the present invention is to provide an image taking apparatus that offers zooming capability but that nevertheless is compact, satisfactorily slim, and usable.

To achieve the above object, according to one aspect of the present invention, an image taking apparatus is provided with: a zoom optical system that forms an optical image of an object with a variable magnification and that includes an aperture stop in the optical path; a solid-state image-sensing device that has a photoreceptive surface on which it receives the optical image formed by the zoom optical system and that converts the optical image into an electrical image signal to output it; a shutter that shuts off with predetermined timing the optical image incident on the photoreceptive surface of the solid-state image-sensing device, that is disposed on the optical axis of the zoom optical system but at a different position from the aperture stop included therein, and that is kept stationary relative to the solid-state image-sensing device during zooming; and an optical member that has an optical power and constitutes part of the zoom optical system and that is disposed closer to the solid-state image-sensing device than the shutter is.

According to another aspect of the present invention, a camera is provided with: an image taking apparatus as described above; and an image processor that processes the image signal output from the solid-state image-sensing device in a way necessary to record and/or display an image based on the image signal.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
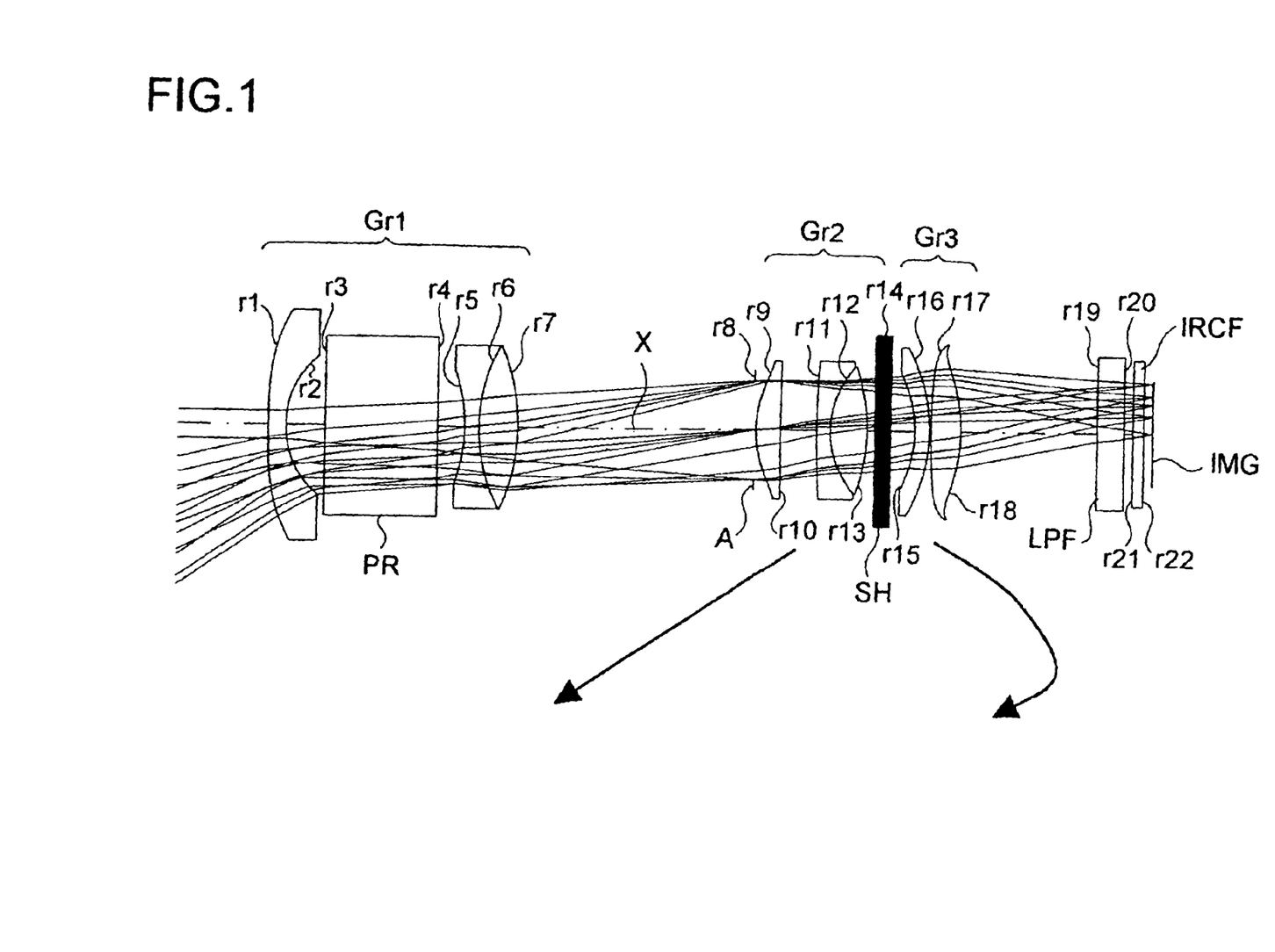
FIG. 1 is a construction diagram of a zoom lens system used in an image taking apparatus embodying the invention (a sectional view at the maximum angle of view)
Figure 2:
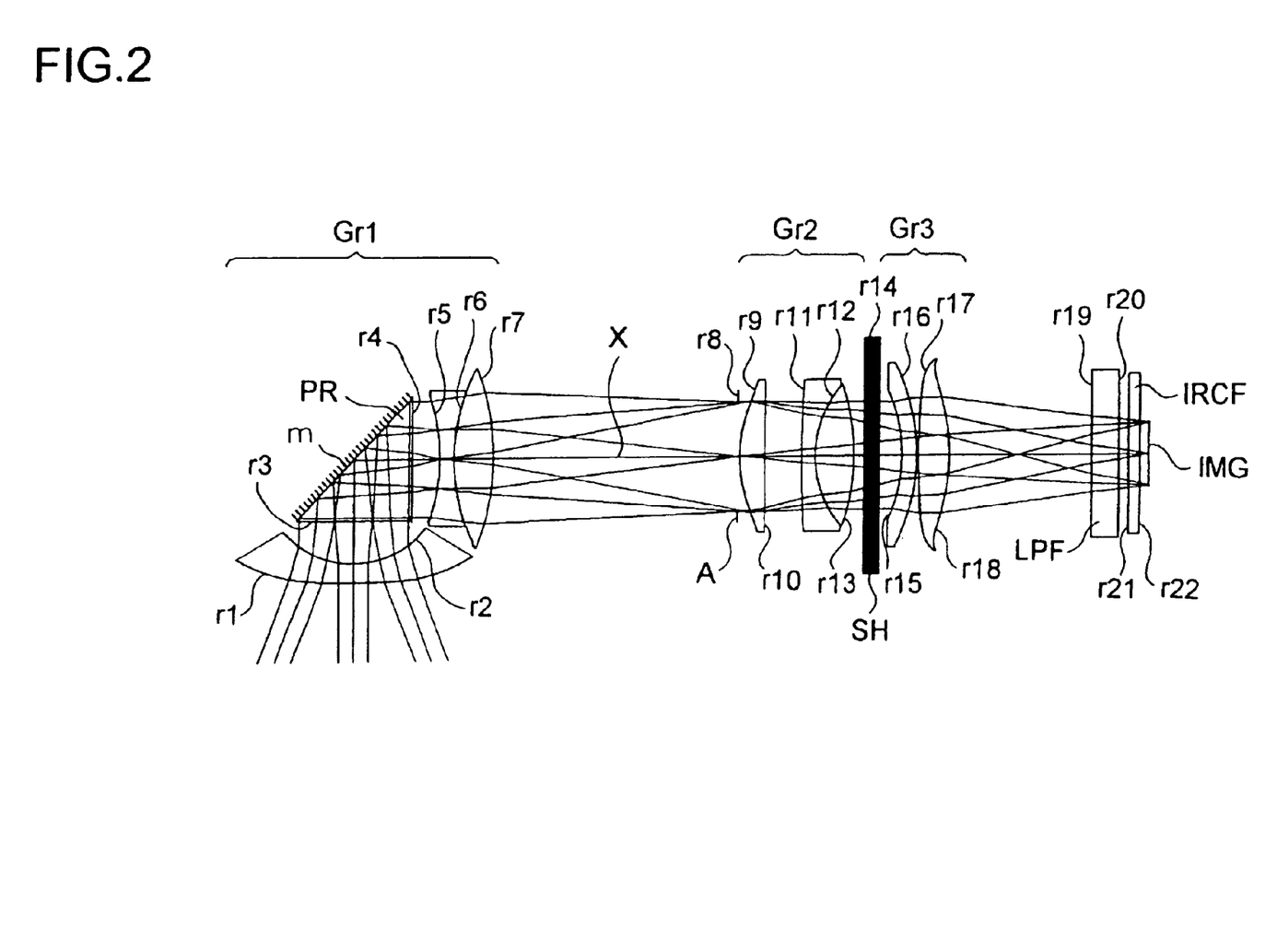
FIG. 2 is a construction diagram of the zoom lens system used in an image taking apparatus embodying the invention (a sectional view parallel to the shorter sides of the screen)
Figure 3A:
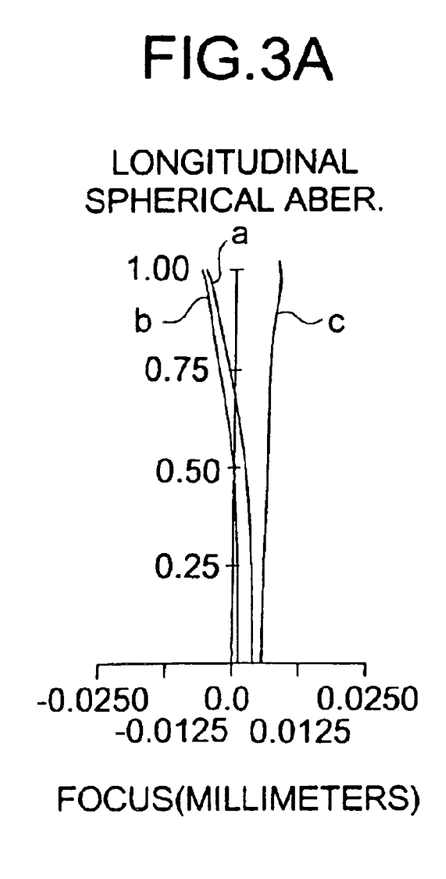
FIGS. 3A to 3C are aberration diagrams obtained at the wide-angle end (W) with the focus at infinity.
Figure 3B:
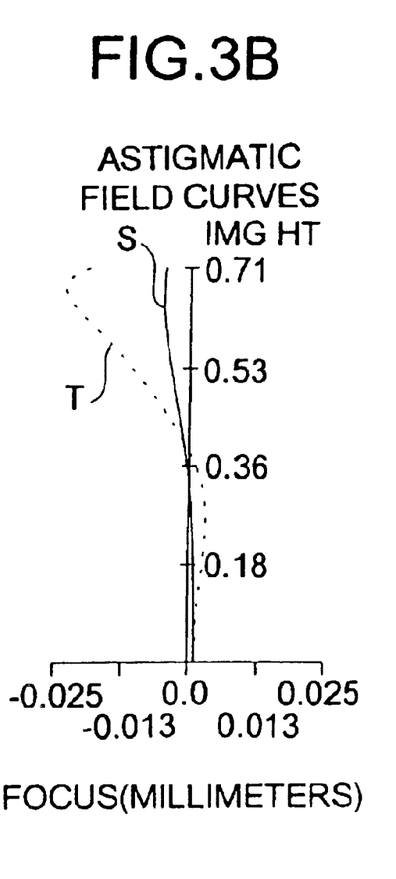
Figure 3C:
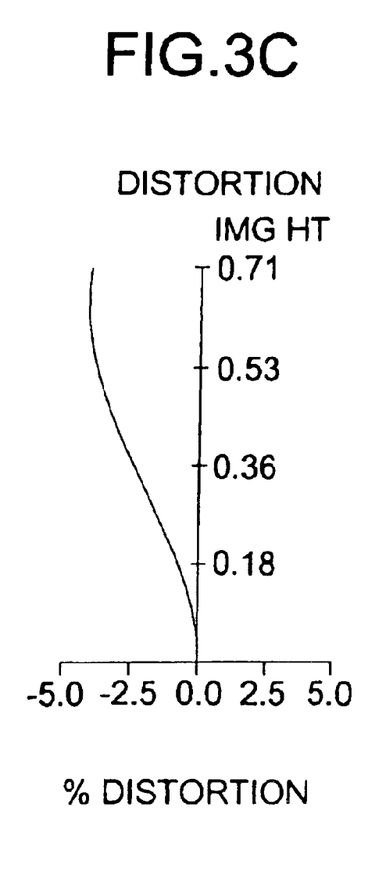
Figure 4A:
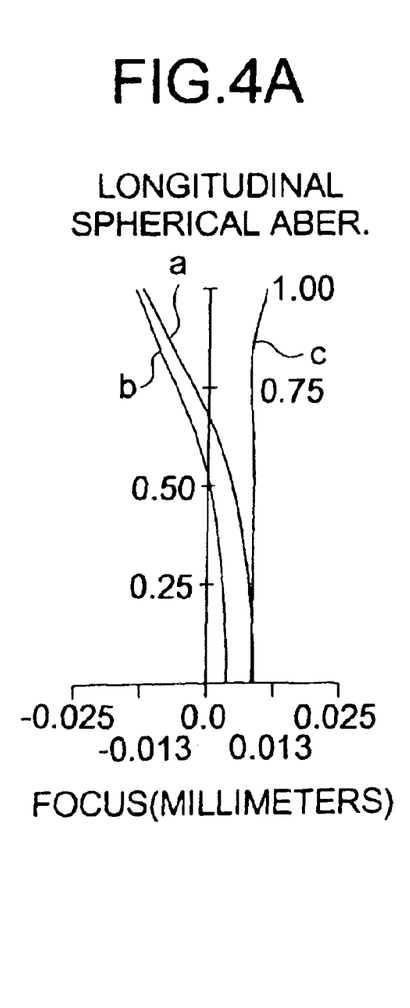
FIGS. 4A to 4C are aberration diagrams obtained at the middle focal length (M) with the focus at infinity.
Figure 4B:
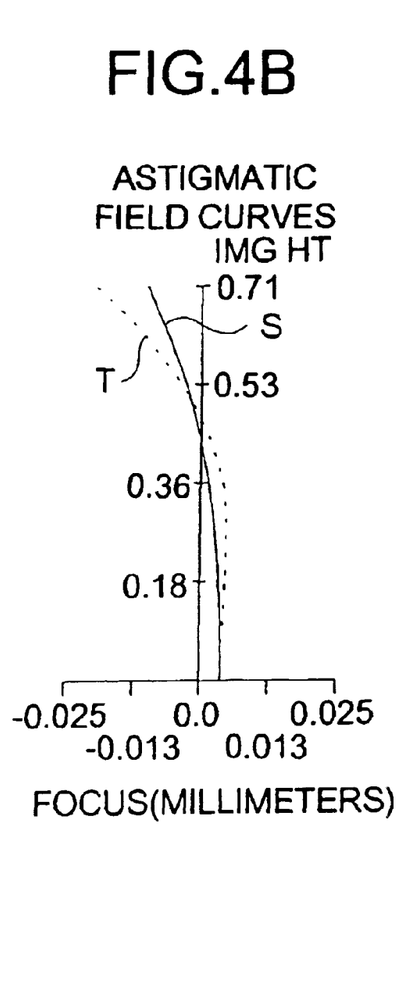
Figure 4C:
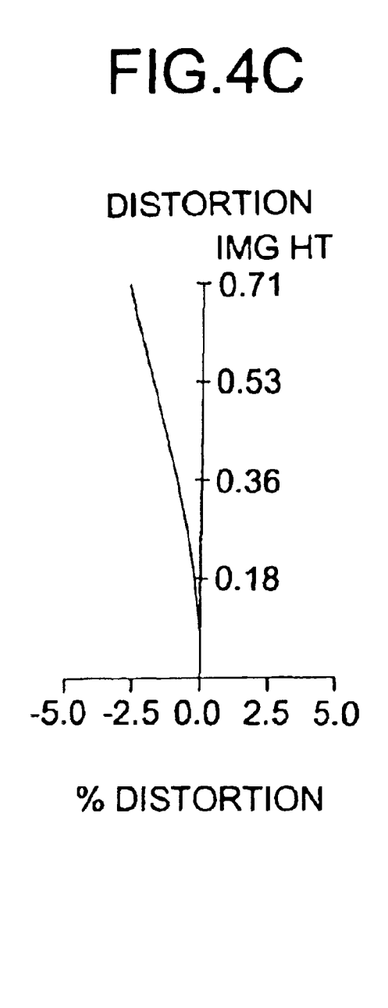
Figure 5A:
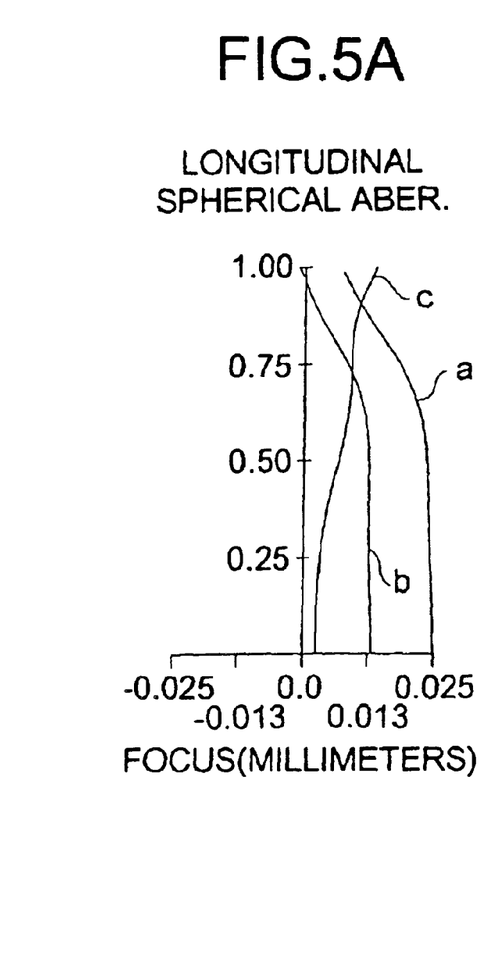
FIGS. 5A to 5C are aberration diagrams obtained at the telephoto end (T) with the focus at infinity.
Figure 5B:
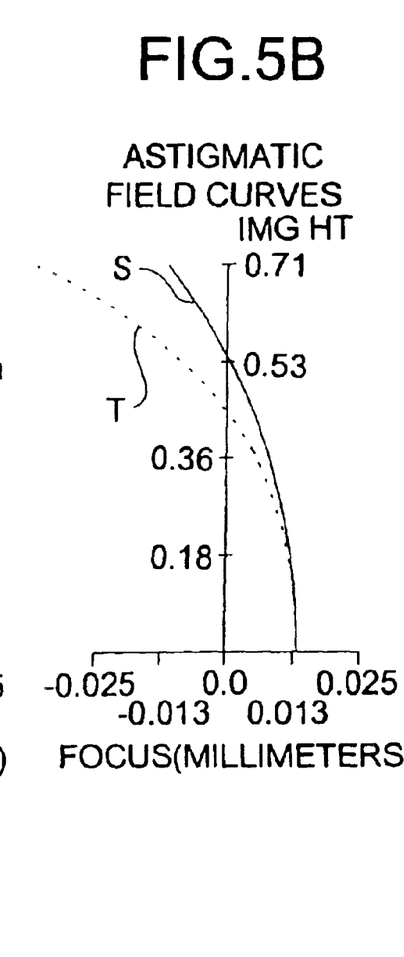
Figure 5C:
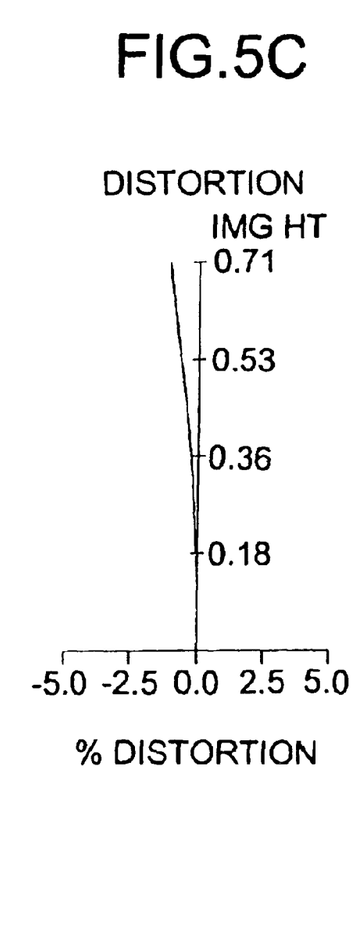
Figure 6A:
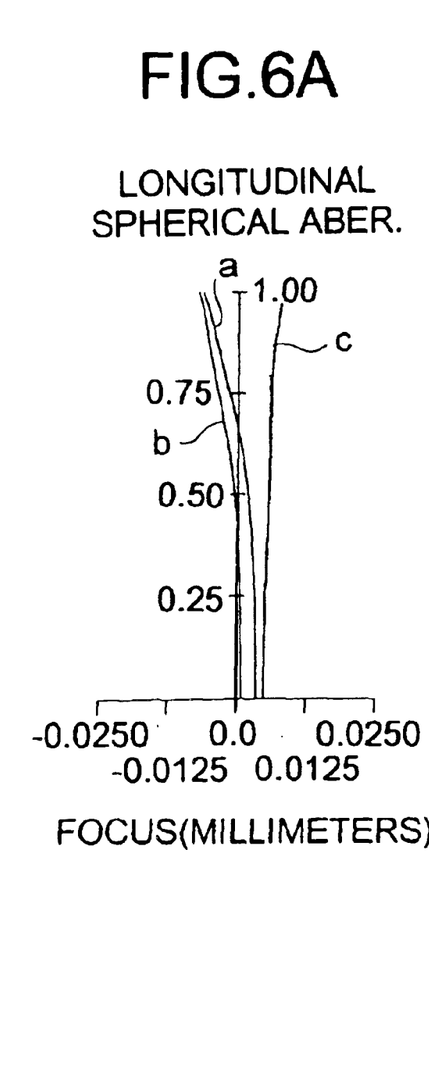
FIGS. 6A to 6C are aberration diagrams obtained at the wide-angle end (WK) with the focus at a close distance.
Figure 6B:
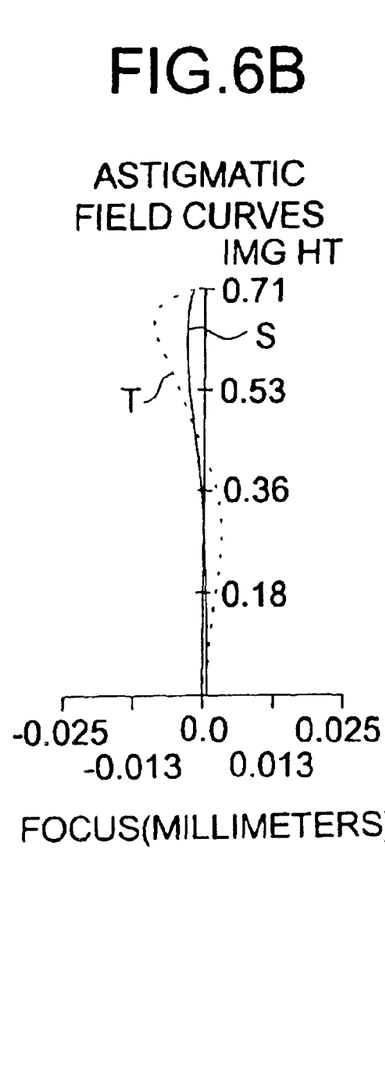
Figure 6C:
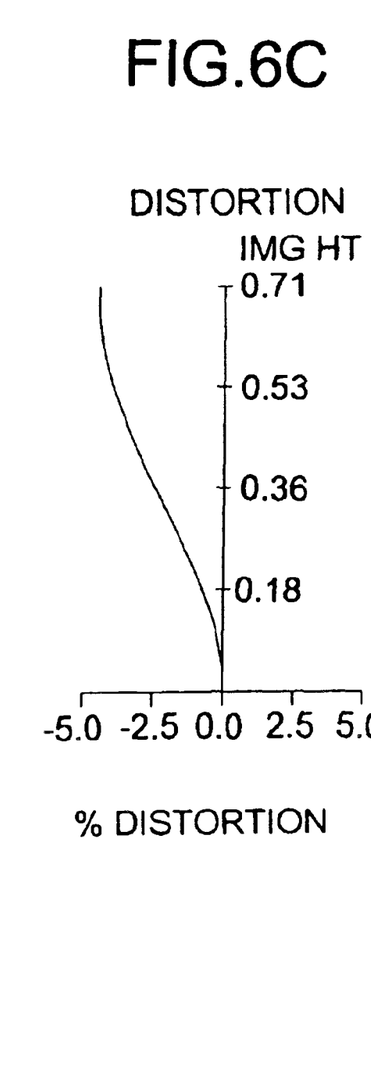
Figure 7A:
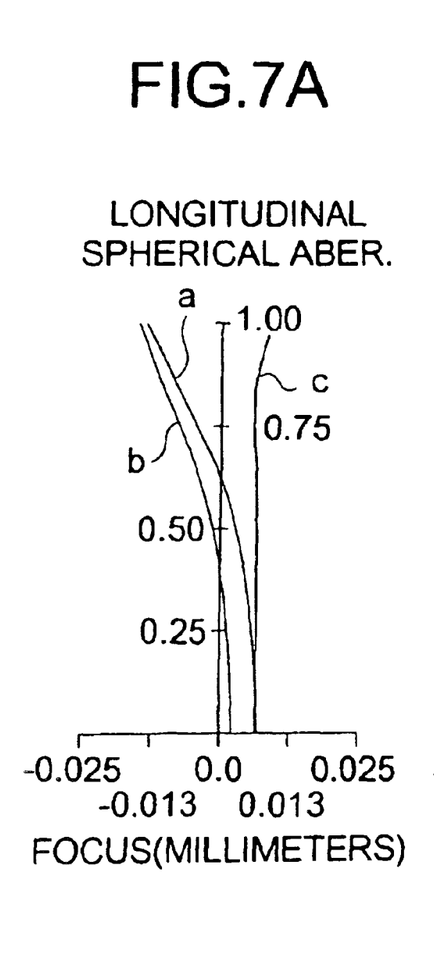
FIGS. 7A to 7C are aberration diagrams obtained at the middle focal length (MK) with the focus at a close distance.
Figure 7B:
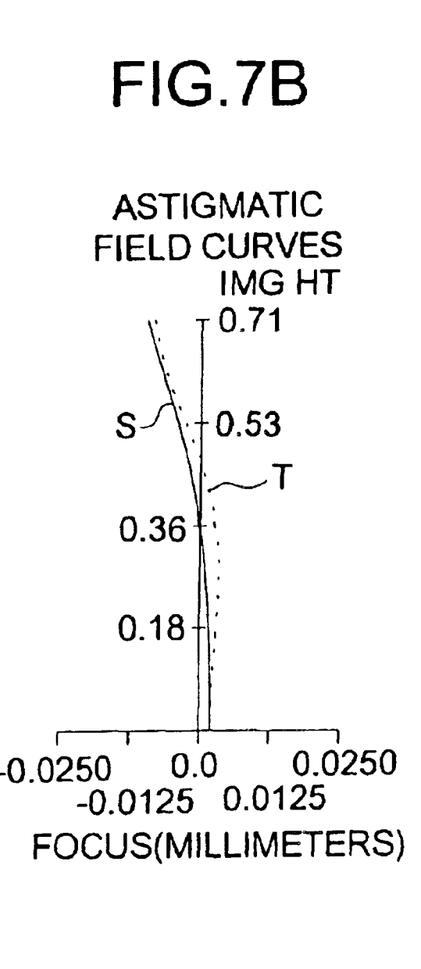
Figure 7C:
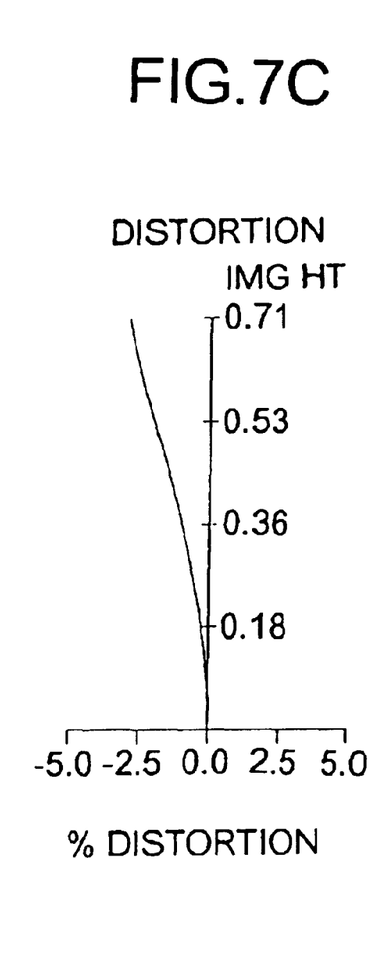
Figure 8A:
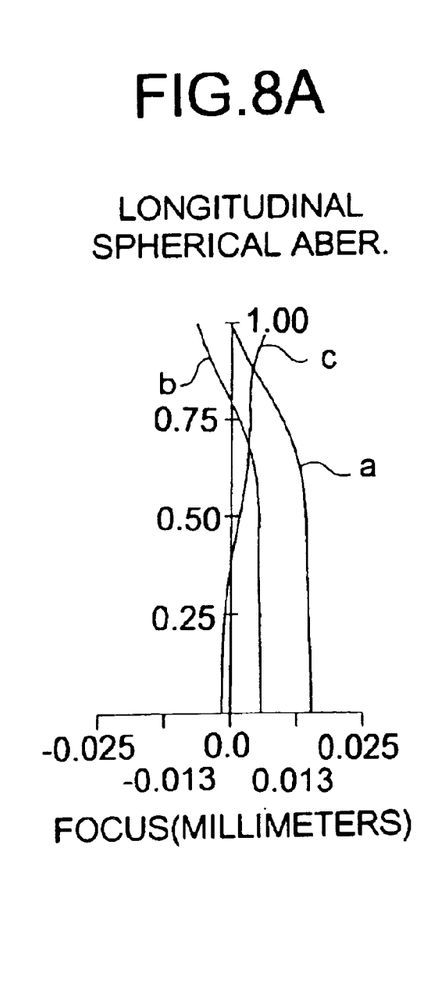
FIGS. 8A to 8C are aberration diagrams obtained at the telephoto end (TK) with the focus at a close distance.
Figure 8B:
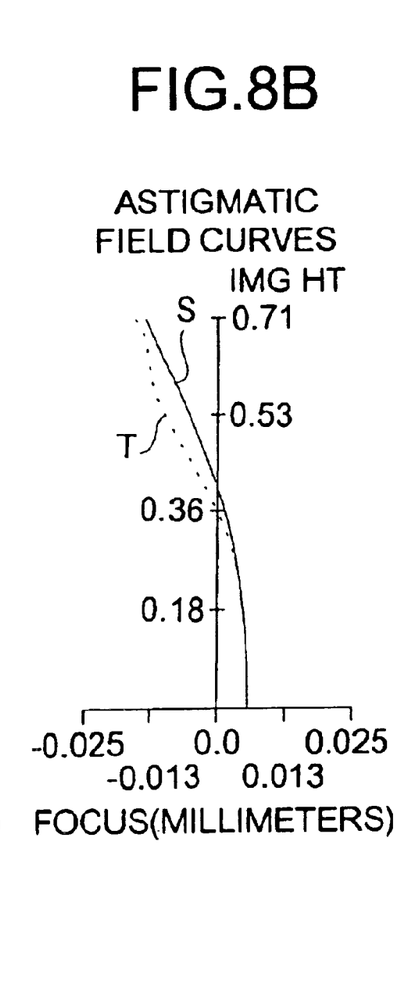
Figure 8C:
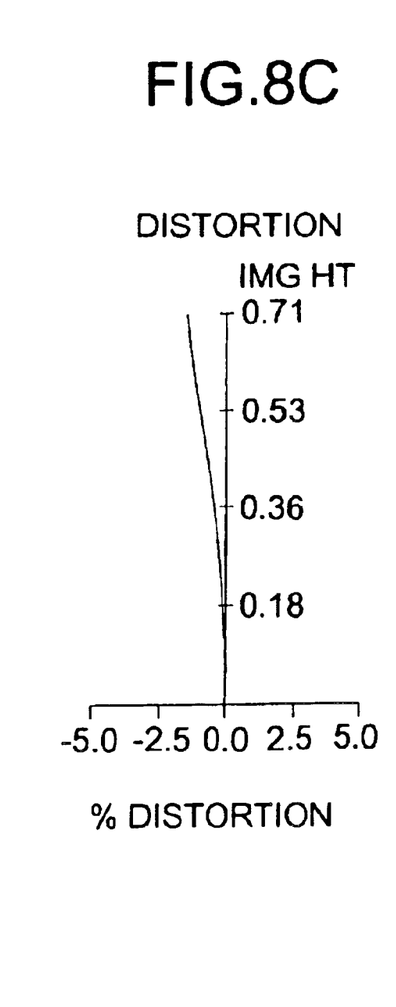

Hereinafter, embodiments of the present invention will be described with reference to the drawings. FIGS. 1 and 2 are construction diagrams showing the lens construction, as observed at the wide-angle end, of a zoom lens system used in an image taking apparatus embodying the invention. FIG. 1 shows the optical path as seen in a section at the maximum angle of view. In this figure, a rectangular prism PR serving as a reflective member for bending the optical axis X of the object light at substantially 90° is illustrated as a parallel plate so that the optical path is shown in a straightened form. On the other hand, FIG. 2 shows the optical path as seen in a section parallel to the shorter sides of the screen. This figure shows how the optical axis X of the object light is bent at substantially 90° with the rectangular prism PR (having a reflective surface "m") serving as the reflective member.

As shown in these figures, the zoom lens system used in an image taking apparatus embodying the invention is composed of, from the object side, a first lens unit Gr1 having a negative optical power, a second lens unit Gr2 having a positive optical power, a shutter SH kept stationary relative to the image plane, a third lens unit Gr3 having a positive optical power, and a solid-state image-sensing device IMG. Immediately in front of the solid-state image-sensing device IMG, there are disposed a low-pass filter LPF and an IR cut filter IRCF. It is to be noted that, in the following descriptions, what is referred to simply as a "shutter" is a member capable of shutting off light, such as a mechanical shutter or liquid crystal shutter, as distinguished from an electronic shutter.

In the zoom lens system of this embodiment, the first lens unit Gr1 has a rectangular prism PR within itself, and is kept stationary relative to the image plane. The second lens unit Gr2 has an aperture stop within itself, and moves from the image side to the object side during zooming from the wide-angle end to the telephoto end. The third lens unit Gr3, during zooming from the wide-angle end to the telephoto end, first moves from the object side to the image side and then, near the telephoto end, from the image side to the object side; that is, it moves along a U-shaped trajectory convex to the image side.

Image taking apparatuses, such as digital cameras, are typically provided with either a solid-state image-sensing device of the interlaced scanning type or a solid-state image-sensing device of the progressive scanning type. In such an image taking apparatus, it is common to achieve photographing in the following manner. With a solid-state image-sensing device of the interlace scanning type, a shutter is opened and closed to give the desired exposure to the solid-state image-sensing device, and then, with the shutter closed, the electric charges accumulated in the solid-state image-sensing device are transferred to a processing device. On the other hand, with a solid-state image-sensing device of the progressive scanning type, the amounts of electric charges accumulated in the solid-state image-sensing device are controlled by the electronic shutter of the solid-state image-sensing device itself, and then, with the shutter closed, the electric charges accumulated in the solid-state image-sensing device are transferred to a processing device.

In either case, electric charges are transferred with the shutter closed. This is because, if the solid-state image-sensing device is irradiated with light when electric charges are being transferred, the transferred electric charges suffer noise, which degrades the obtained image. This should be avoided. Thus, in an image taking apparatus provided with a solid-state image-sensing device, a shutter is indispensable to obtain images with little noise.

Incidentally, a shutter is generally disposed at or near the position of the optical aperture stop of an optical system. Moreover, a shutter, if it is of the mechanical type, is composed of a light-shielding member, such as a blade, for shutting off light, a drive spindle for driving the light-shielding member, and a drive device, such as a motor, for giving a drive force to the drive spindle. Thus, a shutter is heavy as compared with optical components. Moreover, the light-shielding member, such as a blade, requires space for retraction, and accordingly makes the optical system larger in its radial direction. Hence, a shutter is generally large and heavy.

On the other hand, in an image taking apparatus employing a zoom optical system, it is common to dispose a shutter at the position of the optical aperture stop of the zoom optical system. This makes it possible not only to shut off light from a solid-state image-sensing device but also to restrict the aperture of the shutter and thereby vary the brightness (the f-number) of the optical system. In a case where the optical aperture stop moves relative to the image-sensing device during zooming, however, disposing the shutter at that position makes it necessary to drive not only lenses but also the shutter.

As described above, a shutter is heavy and bulky. Thus, moving a shutter along the optical axis places a heavy burden on the drive mechanism, and makes the lens barrel larger. This undesirably spoils compactness. To avoid this, in a case where the optical aperture stop moves during zooming, a shutter is disposed not within a movable lens unit as at the position of the optical aperture stop but at a fixed position away from the optical aperture stop as in the present invention. This helps make an image taking apparatus compact.

Zoom optical systems are classified roughly into those of a positive-led type in which the first lens unit has a positive optical power and those of a negative-led type in which the fist lens unit has a negative optical power. In general, the positive-led type is suitable for high-magnification zooming with a zoom ratio of 5 or higher, and the negative-led type is suitable for low- and middle-magnification zooming with a room ratio of about 3. Thus, easily portable compact image taking apparatuses generally adopt the negative-led type.

However, the negative-led type, in its typical construction as in the present invention, is composed of, from the object side, a first lens unit having a negative optical power, a second lens unit having a positive optical power, and a third lens unit having a positive optical power wherein the optical aperture stop moves together with the second lens unit during zooming. Thus, disposing a shutter at the position of the optical aperture stop as conventionally practiced increases the weight of the second lens unit, makes its drive mechanism larger, and thus results in making the camera as a whole larger. This imposes a limit to achieving further compactness.

To overcome such inconveniences, it is preferable to dispose a shutter at a fixed position different from the position of the optical aperture stop as in the present invention. This helps make an image taking apparatus compact. Specifically, between the second and third lens units, a shutter that is kept stationary during zooming is disposed. This helps make the lens barrel compact.

When the optical elements, such as lenses and an aperture stop, constituting a zoom lens system are linearly arranged without bending the optical axis as conventionally practiced, the dimension of the zoom lens unit in the thickness direction is practically determined by the distance from the most object-side component of the zoom lens system included in the image taking apparatus to the image-sensing device.

On the other hand, as the image processing power of semiconductor devices and the like increases, image taking apparatuses incorporated in personal computers, mobile computer s, cellular phones, PDAs (personal digital assistants), and the like have come to be required to offer increasingly high resolution, high magnification, and high image quality, as opposed to conventional simple types. Correspondingly, zoom lens systems for use in such image taking apparatuses have come to include an increasingly large number of lens elements. This makes it difficult to achieve satisfactory slimness because of the thickness of lens elements even in the not-in-use state (i.e., the collapsed state).

By contrast, as in the zoom lens system according to the present invention, adopting a construction in which the optical axis of the object light is bent at substantially 90° with a reflective surface makes it possible to reduce the dimension of an image taking apparatus in the thickness direction in its not-in-use state down to the distance from the most object-side lens element to the reflective surface. This helps make the image taking apparatus apparently slim.

Moreover, adopting a construction in which the optical axis of the object light is bent at substantially 90° with a reflective surface permits the optical path of the object light to have an overlap near the reflective surface. This makes it possible to effectively use space and thereby make the image taking apparatus more compact. Here, it is preferable to dispose the reflective surface within the first lens unit. That is, by disposing the reflective surface within the first lens unit, which is disposed at the object side end, it is possible to minimize the dimension of the image taking apparatus in the thickness direction.

The member having the reflective surface may be an internal-reflection prism, surface-reflection prism, internal-reflection flat mirror, or surface-reflection mirror, among which the most suitable is an inter al-reflection prism. That is, when an internal-reflection prism is adopted, the object light passes through the medium of the prism, and the surface-to-surface distance through the prism is shorter, according to the refractive index of the medium, than the equivalent ordinary physical distance as through air. Thus, it is preferable to adopt as the reflective surface an internal reflection prism, because this makes it possible to realize an optically equivalent construction with less space.

The reflective surface does not have to be a perfect total-reflection surface. For example, the reflectivity of part of the reflective surface may be adjusted appropriately so as to make part of the object light branch off and direct it to a sensor for metering or distance measurement. The reflectivity of the entire reflective surface may be adjusted appropriately so as to split the object light into two beams and direct one to a viewfinder.

Here, in a case where the optical axis of the object light is bent at substantially 90° with a reflective member, it is preferable that the condition below be fulfilled.

$$4 > Dref/Ymax > 2.5$$

where
  Dref represents the sum of the axial distances between the object-side optical component located immediately in front of the reflective member and the image-side optical component located immediately behind the reflective member; and
Ymax represents the maximum image height.

The condition above defines the construction around the reflective member that is suitable for a slim digital camera. Transgressing the upper limit of the condition is undesirable, because that makes the bent portion large, and thus makes it impossible to reduce the apparent thickness of the optical system and thereby realize a slim digital camera. On the other hand, transgressing the lower limit of the condition is also undesirable, because that makes it impossible to secure sufficient space to bend the optical axis, resulting in vignetting in the bent portion. Setting the upper and lower limits of the above condition at 3.7 and 3.0, respectively, makes it possible to realize a slimmer construction free from vignetting.

The condition above is fulfilled with ample margin in the embodiment being discussed, where $Dref=2.384$ $Ymax=0.712$ $Dref/Ymax=3.348$ Moreover, it is preferable that the first lens unit be kept stationary relative to the image plane during zooming. The first lens unit includes a reflective surface, and therefore moving it requires large space. Moreover, in a case where a prism is used as the reflective surface, the heavy prism needs to be moved, and this undesirably places a heavy burden on the drive mechanism. Moreover, by keeping the first lens unit stationary relative to the image plane during zooming, it is possible to realize an optical system of which the total length does not vary. An optical system of which the total length does not vary is advantageous in that it can be held in a highly rigid box-shaped structure.

In the present invention, focusing to a close shooting distance is achieved by moving the third lens unit to the object side. Conventionally, the driving of lenses related to zooming is achieved by transmitting the drive force of a single drive device to a plurality of movable lens units by way of zoom cams. On the other hand, focusing is achieved by moving a focus lens unit by the use of a separate drive device. However, in a construction where there are only two lens units that are moved for zooming and focusing as in this embodiment, it is possible to connect a drive device directly to each of the two lens units without the use of cams or the like.

In this case, it is preferable to achieve zooming and focusing by controlling the distances traveled by the individual lens units, because this eliminates the need for cams or the like and thus helps simplify the construction, leading to slimming-down. Moreover, it is preferable to include at least a negative lens element and a positive lens element in the third lens unit as shown in FIGS. 1 and 2 and achieve focusing by moving it to the object side, because this helps reduce variations in aberrations.

Now, a practical example of the construction of the optical system of a zoom lens system used in an image taking apparatus embodying the invention will be presented with reference to its construction data, aberration diagrams, and other data. Table 1 shows the construction data of this practical example. This practical example corresponds to the embodiment described above, and therefore the lens construction diagrams (FIGS. 1 and 2) of the embodiment also show the lens construction of the practical example.

In the practical example, ri (i=1, 2, 3, . . . ) represents the i-th lens surface from the object side and its radius of curvature, di (i=1, 2, 3, . . . ) represents the i-th axial distance from the object side, and Ni (i=1, 2, 3, . . . ) and vi (i=1, 2, 3, . . . ) respectively represent the refractive index for the d-line and the Abbe number of the i-th lens element from the object side. Radii of curvature and axial distances are given in mm, with "Flat" indicating a flat surface and "INF" indicating infinity.

In the construction data, for each of the axial distances that vary with zooming or focusing, there are given six values, specifically, from left, the values observed at the wide-angle end (W), middle focal length (M), and telephoto end (T) with the focus at infinity and the values observed at the wide-angle end (WK), middle focal length (MK), and telephoto end (TK) with the focus at a close distance.

Listed together are the focal length (f) and the f-number (FNO) of the entire optical system of the practical example as observed at, from left, the wide-angle end (W), middle focal length (M), and telephoto end (T) with the focus at infinity. Also listed are the design wavelength and the maximum image height. In the practical example, a surface of which the radius of curvature is marked with an asterisk (*) is an aspherical surface, of which the surface shape is defined by the formula below.

$$X=CY^2/[1+\{1-(1+K)C^2 Y^2\}^{1/2}]+\Sigma A_i Y^i$$

where

X represents the displacement from the reference surface along the optical axis;

Y represents the height in a direction perpendicular to the optical axis;

C represents the paraxial curvature;

K represents the conic coefficient; and $A_i$ represents the aspherical coefficient of the i-th order.

FIGS. 3A to 3C, 4A to 4C, 5A to 5C, 6A to 6C, 7A to 7C, and 8A to 8C are aberration diagrams of the practical example. FIGS. 3A to 3C, FIGS. 4A to 4C, and FIGS. 5A to 5C show the aberrations observed at the wide-angle end (W), middle focal length (M), and telephoto end (T), respectively, with the focus at infinity, and FIGS. 6A to 6C, FIGS. 7A to 7C, and FIGS. 8A to 8C show the aberrations observed at the wide-angle end (WK), middle focal length (MK), and telephoto end (TK), respectively, with the focus at a close distance. Of these diagrams, those suffixed with "A" show spherical aberration, those suffixed with "B" show astigmatism, and those suffixed with "C" show distortion.

In the spherical aberration diagrams, the solid lines "a," "b," and "c" represent the spherical aberration for rays of wavelengths of 656.28 nm, 587.56 nm, and 435.84 nm, respectively. The wavelength 587.56 nm indicated by the solid line "b" is the design wavelength, and therefore the other aberration diagrams show the aberrations for this design wavelength. In the astigmatism diagrams, the broken line "T" and the solid line "S" represent the astigmatism observed on the meridional and sagittal surfaces, respectively.

Figure 9:
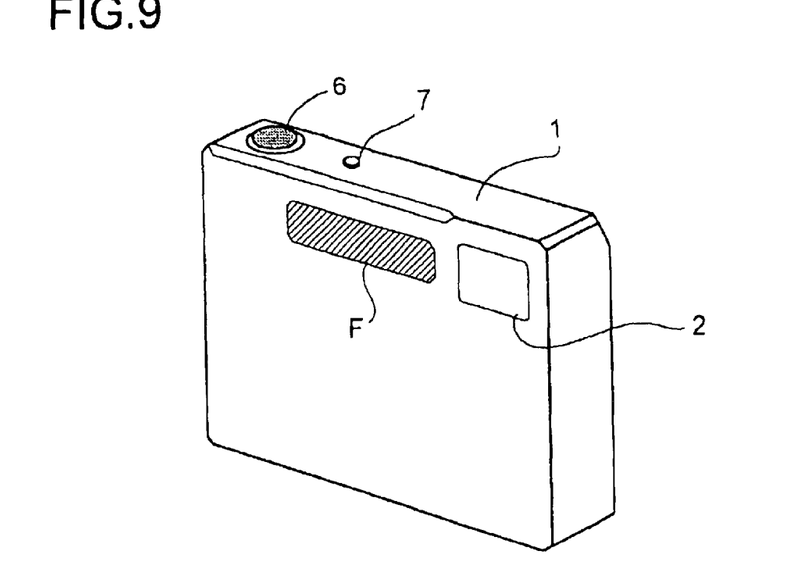
FIG. 9 is an external perspective view of a digital camera as seen from in front.
Figure 10:
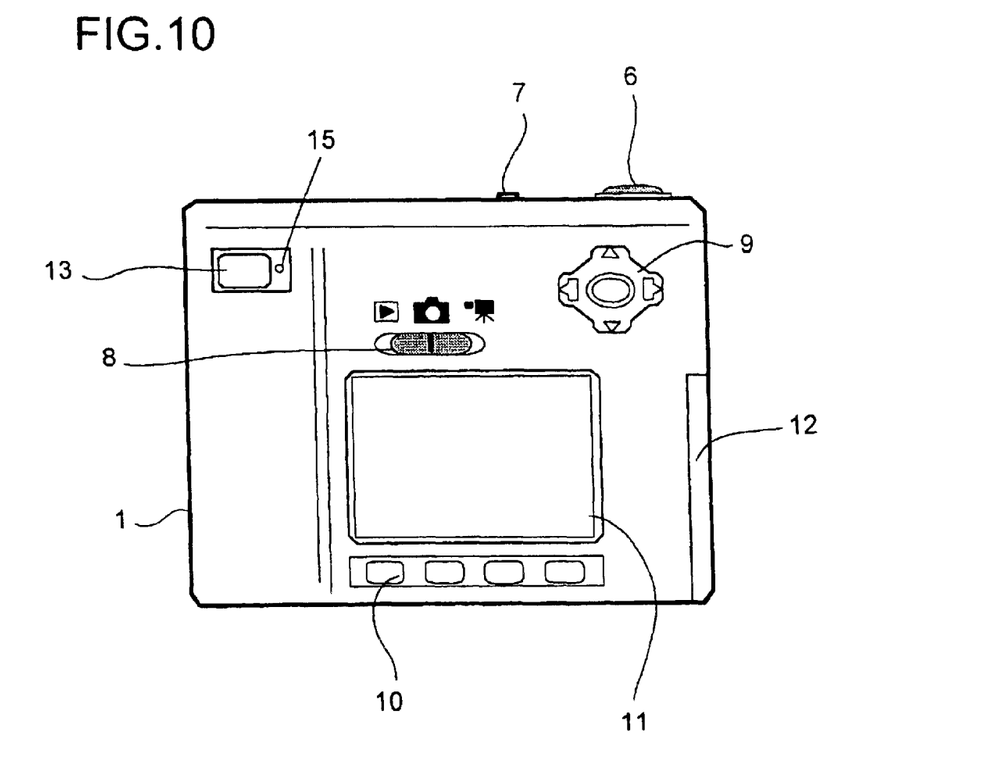
FIG. 10 is a rear view of the digital camera.

Now, a camera that employs the zoom lens system of the practical example described above will be described, taking up as an example a single-CCD digital camera. FIG. 9 is an external perspective view of the digital camera taken up as an example of an image taking apparatus embodying the invention, as seen from in front. FIG. 10 is a rear view thereof. As shown in these figures, the digital camera has a body substantially in the shape of a box close to a flat plate. In an upper right portion of the front face of the body 1 is arranged a taking lens window 2, rectangular in shape, and in an upper portion of the front face is arranged a flash F, rectangular in shape. In a left portion of the top face are arranged a shutter button 6 and a power switch 7, both circular in shape.

In a central portion of the rear face is arranged a large LCD monitor 11, rectangular in shape. Above the LCD monitor 11, a mode switch lever 8 for switching among a still-picture mode, a movie mode, and a playback mode is arranged so as to be slidable in the right/left direction, and below the LCD monitor 11 are arranged various operation buttons 10 side by side horizontally. In an upper right portion of the rear face is arranged an up/down/left/right lever 9, and in an upper left portion of the rear face is arranged an optical viewfinder 13, rectangular in shape. Next to the optical viewfinder 13 is arranged an indicator 15. In a lower right portion of the rear face, toward the right side face, there is arranged a battery chamber/card slot lid 12.

Figure 11:
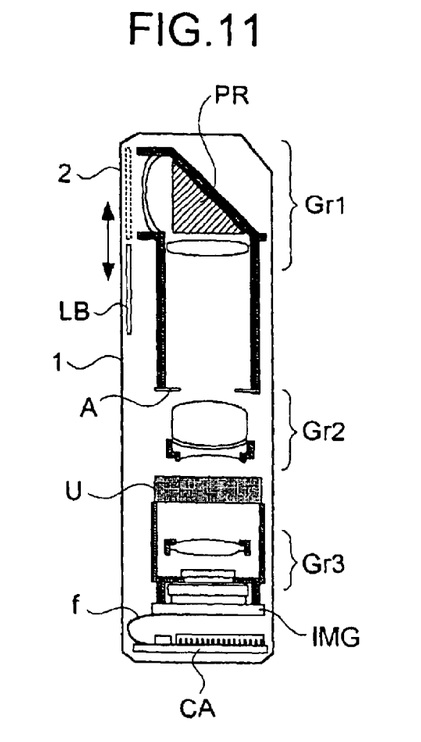
FIG. 11 is a side sectional view showing the construction of the taking lens.

FIG. 11 is a side sectional view showing the construction of the taking lens. Here, a zoom lens system similar to the one described earlier with reference to FIG. 2 is adopted. That is, in this example, the taking lens is arranged upright inside a right portion of the body 1 as seen from in front of the camera, and is composed essentially of a first lens unit Gr1, a rectangular prism PR, an optical aperture stop A, a second lens unit Gr2, a shutter unit U, a third lens unit Gr3, and an solid-state image-sensing device IMG.

To the solid-state image-sensing device IMG is connected, by way of a flexible circuit board "f," a processing device CA, which is arranged at the bottom and performs image processing. The shutter unit U has the shutter SH described earlier. The shutter unit U has a width substantially equal to the maximum diameter of the lens. In an upper front portion inside the body 1 is arranged a lens barrier LB for opening and closing the taking lens window 2. The lens barrier LB is a flat plate that is moved up and down as indicated by arrows and is thereby closed and opened.

Figure 12A:
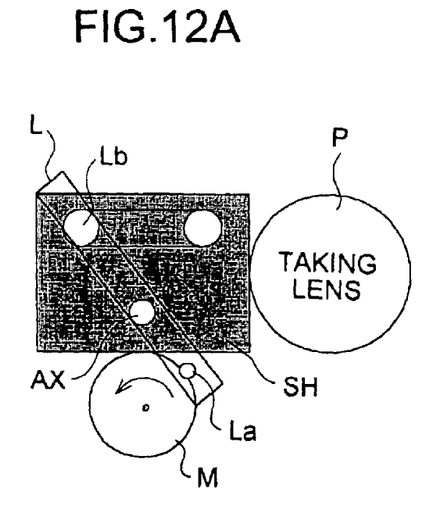
FIGS. 12A and 12B are diagrams schematically showing the construction of the shutter.
Figure 12B:
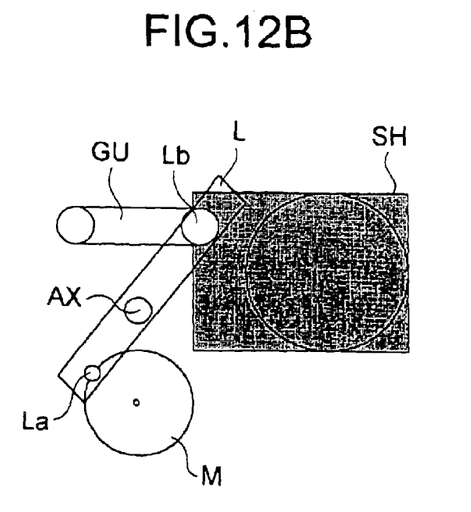

FIGS. 12A and 12B are diagrams schematically showing the construction of the shutter. FIG. 12A shows the shutter in its open state, and FIG. 12B shows the shutter in its closed state. Here, the rotation of a motor M is converted into the movement of the shutter SH. Specifically, with the shutter open, as the motor M rotates counter-clockwise as indicated by an arrow, a pin La vertically extending from one end of an elongate plate shaped lever L perpendicularly to its surface moves from right to left as seen in the figure. As a result, the lever L rotates clockwise about an axis AX, and a pin Lb extending from the other end of the lever L perpendicularly to its surface moves from left to right.

In an interlocked manner with that, the shutter SH coupled to the pin Lb slides rightward along a guide GU, and thus the shutter SH is closed so as to cover the taking lens P and shut off light therefrom. When the shutter SH is opened, the individual components move in the opposite directions. The up/down direction of these figures is the direction of the thickness of the camera. Here, the shutter is constructed as described above to make the camera body slim. However, the shutter may be constructed in any other manner; that is, it may employ any other mechanism, or it may be of any other type, such as a liquid crystal shutter.

Figure 13:
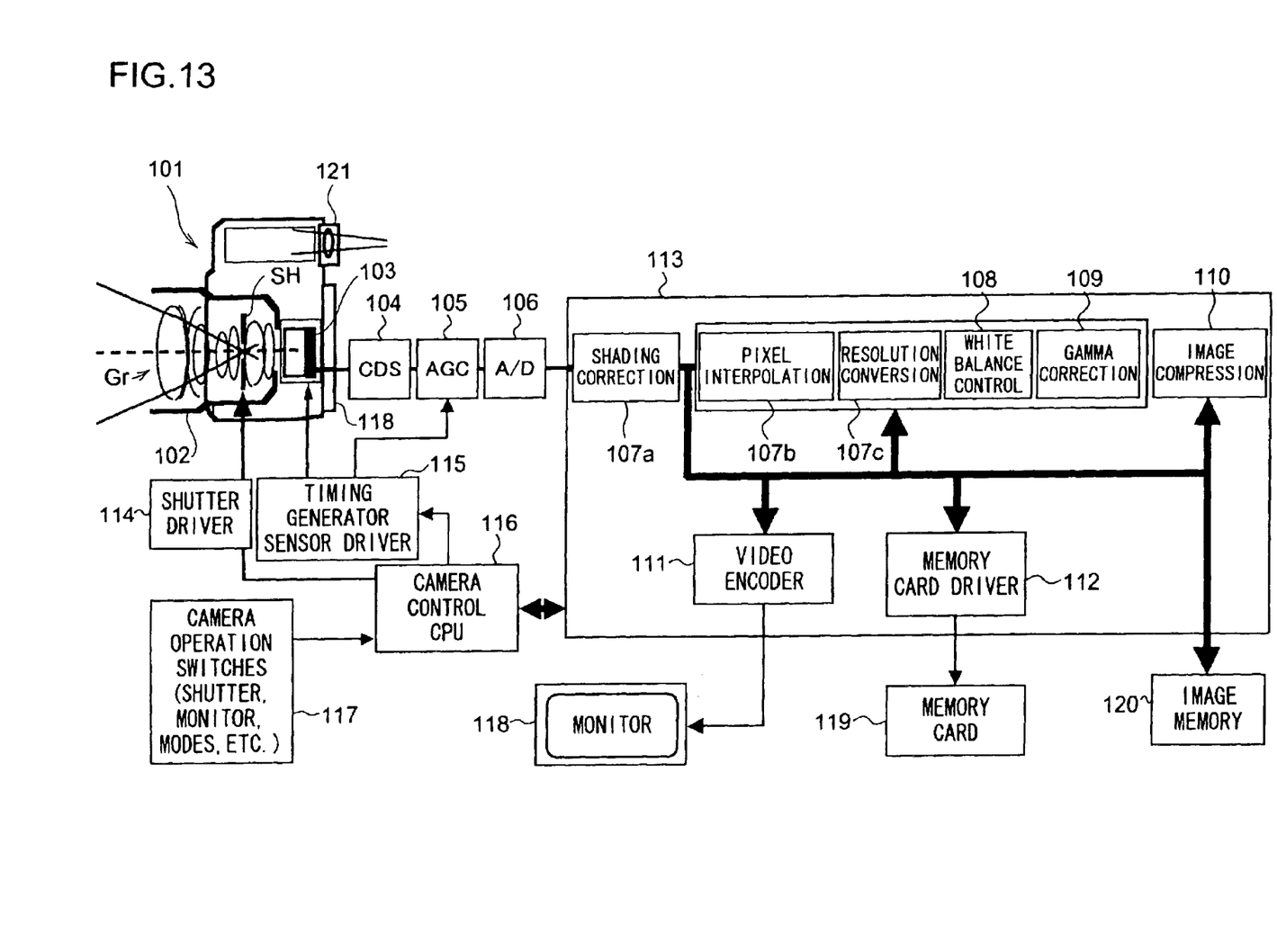
FIG. 13 is a diagram showing the image processing blocks that operate when an image is digitally photographed.

FIG. 13 is a diagram showing the image processing blocks that operate when an image is digitally photographed. As shown in this figure, the digital camera 101 has a lens barrel 102 and an image sensor 103, and the lens barrel 102 incorporates lens units Gr and a shutter SH. Reference numeral 121 represents an optical viewfinder, and reference numeral 117 represents camera operation switches for giving various instructions relating to the shutter, monitor, photographing modes, and the like to the camera. The image sensor 103 is an area image sensor that has RGB primary color transmission filters arranged pixel by pixel in a checkered pattern and that adopts a CCD of the interline interlace reading type, which is a type of two-field type CCD.

When the image through the viewfinder is continuously changing, i.e., when a so-called live view is being presented, the shutter SH is kept open by a shutter driver 114, and a camera control CPU 116 calculates exposure control data on the basis of, of all the brightness data metered by the image sensor 103, the part relating to the selected metering area. Then, on the basis of the calculated exposure control data and according to a preset program line, a timing generator sensor driver 115 performs feedback control so as to make the exposure time of the image sensor 103 appropriate.

When an image is actually photographed, on the basis of the metered brightness data and according to the preset program line, the shutter driver 114 and the timing generator sensor driver 115 control, as by shutting the shutter SH, the exposure of the image sensor 103. When the accumulation of electric charges in the image sensor 103 is complete, the signals obtained through photoelectric conversion are shifted to transfer lines within the image sensor 103, and are then read out therefrom through buffers.

The image signals thus output are then sampled by a CDS 104 so as to be cleared of the noise originating from the image sensor 103, and are then subjected to correction of sensitivity by an AGC 105. The analog signals normalized by the AGC 105 are then converted into digital signals by an A/D 106, which is a 12-bit A/D converter. An image processing CPU 113 performs predetermined processing on these digital signals and thereby creates an image file. The image data taken in by the image processing CPU 113 is written to an image memory 120 in synchronism with the read operation of the image sensor. Thereafter, the data in this image memory 120 is accessed, and the individual circuit blocks perform their respective operation.

The image data in the image memory 120 is subjected to shading correction by a shading correction block 107a. Subsequently, a pixel interpolation block 107b masks the R, G, and B pixels with filter patterns corresponding to those colors, respectively, and then the data of each of the G pixels, which spread up to a high band, is replaced, by a median filter, with the average of the middle two values among the four pixels surrounding it. The data of the R and B pixels is subjected to average interpolation. The signals that have gone through pixel interpolation are then subjected to reduction or thinning-out in the horizontal and vertical directions by a resolution conversion block 107c so as to perform resolution conversion so that the recorded image has the desired number of pixels. The thinning-out in the horizontal direction is performed also for the display on the monitor so as to produce a low-resolution image for an LCD monitor 118.

The data that has gone through resolution conversion is then subjected, separately for R, G, and B data, gain correction by a white balance control block 108 so as to achieve white balance correction among the R, G, and B data. Here, part of the photographed subject that is guessed to be white is extracted on the basis of brightness, saturation, and other data, then the averages of R, G, and B data, respectively, and the G/R and G/B ratios are calculated, and then the gains for the R and B data are corrected to correct the white balance. The data that has gone through white balance correction is then subjected to nonlinear conversion fit for each output device by a gamma correction block 109 and is then stored in the image memory 120.

When a preview image is being presented, the 640×240-pixel low-resolution image read out from the image memory 120 is encoded into the NTSC/PAL format by a video encoder 111, and the thus encoded image is reproduced, as a field image, on the LCD monitor 118. When an image is recorded, an image having the desired resolution is compressed by an image compression block 110, and the thus compressed image is recorded on a memory card 119 by a memory card driver 112. Simultaneously, a screen nail image (VGA) for playback display is produced, and is recorded in association with the image. When the recorded image is reproduced, by displaying the screen nail image, it is possible to display the image quickly.

It is to be noted that the shading correction block not only corrects the brightness at the periphery of the lens, but also corrects for the shading caused by the shutter. To achieve this, a shading correction table corresponding to the shutter speed is used.

In the present invention, in a case where an image-sensing device of the interlaced scanning type is used, the amount of light is usually restricted by opening and closing the shutter. Where, as in the present invention, the optical aperture stop and the shutter are located at different positions, restricting the amount of light by driving the shutter may result in different amounts of light reaching different positions on the screen. To correct this, it is preferable to perform shading. Moreover, disposing as many components as possible of the optical system on the image side of the shutter helps reduce differences in the amount of light among different positions on the screen.

By contrast, in a case where an image sensor of the progressive scanning type is used, the shutter can be used to function solely as a light-shielding member, and thus does not cause shading. Accordingly, it is not necessary to correct for shading caused by the shutter.

In the embodiment described above, the optical aperture stop is provided separately from the lens. However, it is also possible to use any alternative that functions as an optical aperture stop. For example, it is possible to restrict light by adjusting the effective diameter or entrance surface of a lens element, or by the use of a holding member or the like that holds a lens element on the lens barrel. That is, it is possible to use any structure that functions as an optical aperture stop.

TABLE 1

Practical Example
Wavelength: 587.56 nm
Overall Focal Length: f = 1.00 mm~1.75 mm~2.86 mm
F-number: FNO = 2.6~3.8~5.1
Maximum Image Height: 0.71 mm

| Surface No. | Radius of Curvature | Axial Distance | Refractive Index | Abbe Number |
|---|---|---|---|---|
| (Object Plane) | = Flat | | | |
| | | d1 = INF~INF~INF~35.578~35.578~35.578 | | |
| r1* | = 47.437 | | | |
| | | d2 = 0.237 | N1 = 1.77250 | ν1 = 49.77 |
| r2* | = 1.450 | | | |
| | | d3 = 0.522 | | |
| r3 | = Flat | | | |
| | | d4 = 1.494 | N2 = 1.84666 | ν2 = 23.82 |
| r4 | = Flat | | | |
| | | d5 = 0.368 | | |
| r5 | = −2.299 | | | |
| | | d6 = 0.190 | N3 = 1.75450 | ν3 = 51.57 |
| r6 | = 2.255 | | | |
| | | d7 = 0.524 | N4 = 1.83649 | ν4 = 41.22 |
| r7 | = −2.783 | | | |
| | | d8 = 3.183~1.543~0.119~3.183~1.543~0.119 | | |
| (Aperture Stop) r8 | = Flat | | | |
| | | d9 = 0.024 | | |
| r9* | = 1.660 | | | |
| | | d10 = 0.324 | N5 = 1.52200 | ν5 = 52.20 |
| r10* | = 28.521 | | | |
| | | d11 = 0.480 | | |
| r11 | = 11.947 | | | |
| | | d12 = 0.190 | N6 = 1.84937 | ν6 = 35.51 |
| r12 | = 1.301 | | | |
| | | d13 = 0.497 | N7 = 1.48749 | ν7 = 70.44 |
| r13 | = −2.450 | | | |
| | | d14 = 0.100 | | |
| (Shutter) r14 | = Flat | | | |
| | | d15 = 0.539~3.213~5.203~0.493~2.980~4.444 | | |
| r15 | = −1.705 | | | |
| | | d16 = 0.190 | N8 = 1.84666 | ν8 = 23.82 |
| r16 | = −2.363 | | | |
| | | d17 = 0.024 | | |
| r17* | = 8.346 | | | |
| | | d18 = 0.402 | N9 = 1.52200 | ν9 = 52.20 |
| r18* | = −2.413 | | | |
| | | d19 = 1.837~0.802~0.237~1.883~1.035~0.996 | | |
| r19 | = Flat | | | |
| | | d20 = 0.356 | N10 = 1.51680 | ν10 = 64.20 |
| r20 | = Flat | | | |
| | | d21 = 0.119 | | |
| r21 | = Flat | | | |
| | | d22 = 0.142 | N11 = 1.51680 | ν11 = 64.20 |
| r22 | = Flat | | | |
| | | d23 = 0.119 | | |
| (Image Plane) | = Flat | | | |

Aspherical Coefficients of Surface r1

K = 0
A4 = 1.018 × 10$^{-1}$
A6 = −5.144 × 10$^{-2}$

TABLE 1-continued

A8 = 2.054 × 10$^{-2}$
A10 = −3.549 × 10$^{-3}$
A12 = 0
Aspherical Coefficients of Surface r2

K = 0
A4 = 1.096 × 10$^{-1}$
A6 = −1.567 × 10$^{-3}$
A8 = −2.116 × 10$^{-2}$
A10 = 3.252 × 10$^{-2}$
A12 = 0
Aspherical Coefficients of Surface r9

K = 0
A4 = −2.208 × 10$^{-2}$
A6 = 2.277 × 10$^{-2}$
A8 = −5.647 × 10$^{-2}$
A10 = −3.952 × 10$^{-2}$
A12 = 0
Aspherical Coefficients of Surface r10

K = 0
A4 = −1.588 × 10$^{-3}$
A6 = 3.355 × 10$^{-2}$
A8 = −9.916 × 10$^{-2}$
A10 = −4.677 × 10$^{-3}$
A12 = 0
Aspherical Coefficients of Surface r17

K = 0
A4 = −8.225 × 10$^{-3}$
A6 = −1.018 × 10$^{-3}$
A8 = 2.186 × 10$^{-3}$
A10 = 2.652 × 10$^{-2}$
A12 = 0
Aspherical Coefficients of Surface r18

K = 0
A4 = −2.590 × 10$^{-4}$
A6 = −5.065 × 10$^{-3}$
A8 = 7.609 × 10$^{-3}$
A10 = 2.432 × 10$^{-2}$
A12 = 0

What is claimed is:

1. An image taking apparatus comprising:
   a zoom optical system that forms an optical image of an object with a variable magnification, the zoom optical system including an aperture stop in an optical path;
   a solid-state image-sensing device that has a photoreceptive surface on which the solid-state image-sensing device receives the optical image formed by the zoom optical system, the solid-state image-sensing device converting the optical image into an electrical image signal to output the electrical image signal;
   a shutter that shuts off with predetermined timing the optical image incident on the photoreceptive surface of the solid-state image-sensing device, the shutter being disposed on an optical axis of the zoom optical system but at a different position from the aperture stop included therein, the shutter being kept stationary relative to the solid-state image-sensing device during zooming; and
   an optical member that has an optical power and constitutes part of the zoom optical system, the optical member being disposed closer to the solid-state image-sensing device than the shutter is.

2. An image taking apparatus as claimed in claim 1, wherein the zoom optical system has a lens unit having a negative optical power disposed at an object-side end thereof.

3. An image taking apparatus as claimed in claim 2, wherein the lens unit having a negative optical power disposed at the object-side end of the zoom optical system is kept stationary relative to the solid-state image-sensing device during zooming.

4. An image taking apparatus as claimed in claim 1, wherein the zoom optical system includes a reflective member disposed in the optical path so as to bend the optical axis at substantially 90°.

5. An image taking apparatus as claimed in claim 4, wherein the following condition is fulfilled:

$$4>Dref/Ymax>2.5$$

where

Dref represents a sum of axial distances between an object-side optical component located immediately in front of the reflective member and an image-side optical component located immediately behind the reflective member; and Ymax represents a maximum image height.

6. An image taking apparatus as claimed in claim 1, wherein the zoom optical system has a lens unit having a negative optical power disposed at an object-side end thereof, the lens unit including a reflective member disposed in the optical path so as to bend the optical axis at substantially 90°.

7. An image taking apparatus as claimed in claim 6, wherein the following condition is fulfilled:

$$4<Dref/Ymax<2.5$$

where

Dref represents a sum of axial distances between an object-side optical component located immediately in front of the reflective member and an image-side optical component located immediately behind the reflective member; and Ymax represents a maximum image height.

8. An image taking apparatus as claimed in claim 1, wherein the zoom optical system includes, from an object-side end thereof, a first lens unit having a negative optical power, a second lens unit having a positive optical power, and a third lens unit having a positive optical power and disposed at an image-side end thereof, the third lens unit corresponding to the optical member.

9. An image taking apparatus as claimed in claim 8, wherein the zoom optical system includes, from an object-side end thereof, a first lens unit having a negative optical power, a second lens unit having a positive optical power, and a third lens unit having a positive optical power.

10. An image taking apparatus as claimed in claim 8, wherein the first lens unit is kept stationary relative to the solid-state image-sensing device during zooming.

11. An image taking apparatus as claimed in claim 8, wherein the second lens unit moves toward an image side during zooming from a shortest-focal-length state to a longest-focal-length state.

12. An image taking apparatus as claimed in claim 8, wherein the third lens unit moves along a U-shaped trajectory convex to an image side during zooming from a shortest-focal-length state to a longest-focal-length state.

13. An image taking apparatus as claimed in claim 8, wherein the shutter is disposed on an image side of the second lens unit.

14. An image taking apparatus as claimed in claim 8, wherein the aperture stop is included in the second lens unit.

15. An image taking apparatus as claimed in claim 14, wherein the aperture stop is disposed on an object side of the second lens unit and, as the second lens unit moves, the aperture stop moves together therewith.

16. An image taking apparatus as claimed in claim 1, wherein the solid-state image-sensing device is an image-sensing device of an interlaced scanning type.

17. An image taking apparatus as claimed in claim 1, wherein the solid-state image-sensing device is an image-sensing device of a progressive scanning type.

18. A camera comprising:

an image taking apparatus comprising:

a zoom optical system that forms an optical image of an object with a variable magnification, the zoom optical system including an aperture stop in an optical path;

a solid-state image-sensing device that has a photoreceptive surface on which the solid-state image-sensing device receives the optical image formed by the zoom optical system, the solid-state image-sensing device converting the optical image into an electrical image signal to output the electrical image signal;

a shutter that shuts off with predetermined timing the optical image incident on the photoreceptive surface of the solid-state image-sensing device, the shutter being disposed on an optical axis of the zoom optical system but at a different position from the aperture stop included therein, the shutter being kept stationary relative to the solid-state image-sensing device during zooming; and an optical member that has an optical power and constitutes part of the zoom optical system, the optical member being disposed closer to the solid-state image-sensing device than the shutter is; and an image processor that processes the image signal output from the solid-state image-sensing device in a way necessary to record and/or display an image based on the image signal.

19. A camera as claimed in claim 18, wherein the zoom optical system has a lens unit having a negative optical power disposed at an object-side end thereof.

20. A camera as claimed in claim 19, wherein the lens unit having a negative optical power disposed at the object-side end of the zoom optical system is kept stationary relative to the solid-state image-sensing device during zooming.

21. A camera as claimed in claim 18, wherein the zoom optical system includes a reflective member disposed in the optical path so as to bend the optical axis at substantially 90°.

22. A camera as claimed in claim 21, wherein the following condition is fulfilled:

$$4>Dref/Ymax>2.5$$

where

Dref represents a sum of axial distances between an object-side optical component located immediately in front of the reflective member and an image-side optical component located immediately behind the reflective member; and Ymax represents a maximum image height.

23. A camera as claimed in claim 18, wherein the zoom optical system has a lens unit having a negative optical power disposed at an object-side end thereof, the lens unit including a reflective member disposed in the optical path so as to bend the optical axis at substantially 90°.

24. A camera as claimed in claim 23, wherein the following condition is fulfilled:

$$4>Dref/Ymax>2.5$$

where

Dref represents a sum of axial distances between an object-side optical component located immediately in front of the reflective member and an image-side optical component located immediately behind the reflective member; and Ymax represents a maximum image height.

25. A camera as claimed in claim 18, wherein the zoom optical system includes, from an object-side end thereof, a first lens unit having a negative optical power, a second lens unit having a positive optical power, and a third lens unit having a positive optical power and disposed at an image-side end thereof, the third lens unit corresponding to the optical member.

26. A camera as claimed in claim 25, wherein the zoom optical system includes, from an object-side end thereof, a first lens unit having a negative optical power, a second lens unit having a positive optical power, and a third lens unit having a positive optical power.

27. A camera as claimed in claim 25, wherein the first lens unit is kept stationary relative to the solid-state image-sensing device during zooming.

28. A camera as claimed in claim 25, wherein the second lens unit moves toward an image side during zooming from a shortest-focal-length state to a longest-focal-length state.

29. A camera as claimed in claim 25, wherein the third lens unit moves along a U-shaped trajectory convex to an image side during zooming from a shortest-focal-length state to a longest-focal-length state.

30. A camera as claimed in claim 25, wherein the shutter is disposed on an image side of the second lens unit.

31. A camera as claimed in claim 25, wherein the aperture stop is included in the second lens unit.

32. A camera as claimed in claim 31, wherein the aperture stop is disposed on an object of the side of the second lens unit and, as the second lens unit moves, the aperture stop moves together therewith.

33. A camera as claimed in claim 18, wherein the solid-state image-sensing device is an image-sensing device of an interlaced scanning type.

34. A camera as claimed in claim 18, wherein the solid-state image-sensing device is an image-sensing device of a progressive scanning type.

* * * * *